(12) United States Patent
de Vries et al.

(10) Patent No.: US 12,719,666 B2
(45) Date of Patent: Aug. 25, 2026

(54) METHOD FOR GENERATING QUANTUM KEYS FROM MULTIPLE RECEIVERS

(71) Applicant: Quantum Optics Jena GmbH, Jena (DE)

(72) Inventors: Oliver de Vries, Jena (DE); René Heilmann, Schwansee (DE)

(73) Assignee: Quantum Optics Jena GmbH, Jena (DE)

( * ) Notice: Subject to any disclaimer, the term of this patent is extended or adjusted under 35 U.S.C. 154(b) by 112 days.

(21) Appl. No.: 18/966,452

(22) Filed: Dec. 3, 2024

(65) Prior Publication Data

US 2025/0392453 A1 Dec. 25, 2025

(30) Foreign Application Priority Data

Dec. 6, 2023 (DE) ..................... 10 2023 134 071.9

(51) Int. Cl.
*H04L 29/06* (2006.01)
*H04L 9/08* (2006.01)

(52) U.S. Cl.
CPC .......... *H04L 9/0858* (2013.01); *H04L 9/0861* (2013.01)

(58) Field of Classification Search
CPC ............................ H04L 9/0858; H04L 9/0861
See application file for complete search history.

(56) References Cited

U.S. PATENT DOCUMENTS

2013/0301094 A1* 11/2013 Gilbert ................. G11C 13/048 359/107
2021/0176055 A1* 6/2021 Rahman ................ H04L 9/0855
2023/0327779 A1* 10/2023 Vacon .................... G06N 10/40

FOREIGN PATENT DOCUMENTS

DE 10 2022 104 523 A1 8/2023

OTHER PUBLICATIONS

Fitzke Erik et al: "Scalable Network for Simultaneous Pairwise Quantum Key Distribution via Entanglement-Based Time-Bin Coding", PRX Quantum, Bd. 3, Nr. 2, 1. May 2022 (May 1, 2022), XP093237782, ISSN: 2691-3399, DOI:10.1103/PRXQuantum.3.020341Gefunden im Internet: URL:https://arxiv.org/pdf/2110.13795> sections I-III, figures 1(a)-(c), 2, 3.

(Continued)

*Primary Examiner* — Wasika Nipa
(74) *Attorney, Agent, or Firm* — Hoffmann & Baron, LLP

(57) ABSTRACT

A method for quantum key generation with entangled photon pairs between at least four receivers (4) is proposed, with the following steps:

i) generation of entangled photon pairs;
ii) splitting the signal photons and the idler photons to quantum channels on the basis of their wavelength and transmitting the signal photons and the idler photons via a splitter (6) and/or switch (7);
iii) detection of the signal photons and idler photons at the respective receivers (4);
iv) quantum key generation between the receivers (4).

13 Claims, 4 Drawing Sheets

(56) References Cited

OTHER PUBLICATIONS

Wengerowsky Sören et al: “An entanglement-based wavelength-multiplexed quantum communication network”, Nature, Bd. 564, Nr. 7735, Dec. 12, 2018 (Dec. 12, 2018), Seiten 225-228, XP036657342,DOI: 10.1038/S41586-018-0766-Y [gefunden am Dec. 12, 2018].
European Search Report dated Apr. 4, 2025.
Joshi et al.—A trusted-node-free eight-user metropolitan quantum communication network—pp. 1-15—Sep. 11, 2020.
Bialowons et al.—A scalable network for simultaneous pairwise quantum key distribution via entanglement-based time-bin coding—pp. 1-15—Oct. 26, 2021.
German Office Action dated Aug. 27, 2024.

* cited by examiner

METHOD FOR GENERATING QUANTUM KEYS FROM MULTIPLE RECEIVERS

BACKGROUND OF THE INVENTION

The invention relates to a method for quantum key generation between at least four receivers according to the features of the preamble of claim 1 and to a system for quantum key generation between at least four receivers according to the features of the preamble of claim 13.

Networks for quantum key generation with entangled photon pairs are well known. In these networks, several receivers are connected to each other via a source, for example. In such a network, the number of physical connections, i.e. the quantum channels between the receivers, only increases via the relation $i(i-1)/2$, where i is the number of receivers. In contrast, networks with a direct connection between all receivers require a large number of additional quantum channels.

In networks for quantum key generation with multiple receivers that are connected to each other via a source, several photon pairs entangled in an entanglement property are generated in the source and assigned to the individual receivers according to the wavelength, for example. Quantum keys can be generated between all receivers on the basis of the entangled photon pairs.

For quantum key generation, the connection between the two receivers of the entangled photon pairs must be aligned with regard to the selected entanglement property. This means that both receivers agree on a common reference system for the entanglement property. This entanglement property can, for example, represent the polarization, the time and/or the mode of the photons, whereby in the case of polarization the alignment of the connection is carried out, for example, in a fiber via a polarization control.

In known systems, such an alignment is always carried out between two receivers. In known systems with multiple receivers, all receivers are aligned to a reference system. The problem here is that simultaneous alignment between multiple receivers interferes with each other and this is only possible by repeated alignment steps between all receivers in order to gradually converge, as the multiple receivers sometimes use the same fiber. In known networks, this mutual interference is accepted, resulting in a lower quality of connection between all receivers, which greatly reduces the rate of quantum key generation. Furthermore, such simultaneous alignment between multiple receivers is very time-consuming and very resource-intensive.

SUMMARY OF THE INVENTION

It is the object of the present invention to provide an improved, more efficient, faster, and more robust method for quantum key generation between at least four receivers and a corresponding device.

According to the invention, this object is achieved by a method for quantum key generation between at least four receivers.

According to the invention, a method for quantum key generation with entangled photon pairs between at least four receivers is proposed, wherein in each case two receivers of an entangled photon pair form a connection $V_j$ for quantum key generation, with the following steps:

i) generating entangled photon pairs in a source, each photon pair comprising a signal photon and an idler photon which are entangled with each other in an entanglement property;

ii) splitting the signal photons and the idler photons on the basis of their wavelength to quantum channels of the multiple receivers and transmitting the signal photons and the idler photons from the source to the receivers via the quantum channels forming connections $V_j$;

iii) detection of the signal photons and idler photons at the respective receivers;

iv) quantum key generation between the receivers of the entangled photon pairs.

It is essential that several time spans are formed for quantum key generation between all receivers, with steps i) to iii) being carried out in each time span, and that, in each time span before and/or during step ii), an entanglement property alignment is performed only between two or more connections $V_j$ which can be aligned independently of one another in order to enable quantum key generation in these two or more connections $V_j$, and that the time spans differ in such a way that in each case at least one connection $V_j$ is replaced by another connection $V_j$ in which quantum key generation was not yet possible in order to carry out quantum key generation between all receivers by means of the multiple time spans, and that the transmission in step ii) takes place via a splitter and/or switch in the quantum channel.

The object is further achieved by a system for quantum key generation with entangled photon pairs between at least four receivers.

In accordance with the invention, a system for quantum key generation with entangled photon pairs between at least four receivers is proposed, wherein the system comprises a source, a frequency multiplexer, several quantum channels and the multiple receivers, each of the multiple receivers being connected to the source via a quantum channel, wherein the source is designed to generate entangled photon pairs each comprising a signal photon and an idler photon which are entangled with each other in an entanglement property, wherein the quantum channels of two receivers of an entangled photon pair form a connection $V_j$ for quantum key generation, wherein the frequency multiplexer is arranged in or after the source, wherein the frequency multiplexer is designed to distribute the signal photons and idler photons to the quantum channels of the multiple receivers on the basis of their wavelength, wherein each receiver has a detection module which has a measuring module and at least one detector which are designed to detect the entanglement property of the photons for quantum key generation, wherein the system has alignment devices which are arranged in the receivers or in the quantum channels to the receivers and are designed to perform an alignment of the entanglement property of the entangled photon pairs with respect to two receivers.

It is essential that the system also has a control device and the control device is connected to each alignment device, and that the control device is designed to control the alignment devices in several time spans for quantum key generation between all receivers, preferably for carrying out the method for quantum key generation according to steps i) to iv), wherein the control device is designed to control in each time span only the alignment devices between two or more connections $V_j$ which can be aligned independently of each other in order to enable quantum key generation in these two or more connections $V_j$, wherein the control device is designed to replace, in each time span, the control of the alignment device of at least one connection $V_j$ by the control of the alignment device of another connection $V_j$ in which quantum key generation was not yet possible in order to perform quantum key generation between all receivers by means of the multiple time spans, and that two or more receivers are connected to the source via a splitter and/or a switch via a common quantum channel.

An advantage of the method according to the invention and the system according to the invention is that, by the temporal rotation of the alignment and thus for quantum key generation, a supply of quantum keys is generated between all receivers in the time spans. After passing through the several time spans, all receivers are provided with entangled photon pairs, wherein, according to the invention, each connection was aligned at least once between each receiver for quantum key generation in at least one time span.

In the method according to the invention and the system according to the invention, quantum keys are generated at all receivers by rotating the connections $V_j$ through, so that after the several time spans each receiver has generated a quantum key with every other receiver.

Advantageously, by aligning the entanglement properties only between independent connections in the time spans, the method and the system are optimized in such a way that a better generation rate for quantum key generation between all receivers is obtained by the time division of the alignment according to the invention. The better generation rate is obtained because the connections $V_j$ can be aligned more precisely and more quickly using the method and system according to the invention. This is due to the fact that, according to the invention, several connections $V_j$, but only connections independent from each other, are aligned simultaneously, which means that the alignment does not interfere with each other.

It is also advantageous that the quantum key generation according to the invention can be carried out faster and thus environmental effects, such as temperature fluctuations or vibrations, can be compensated for more precisely and quickly, since the alignments do not interfere with each other. Due to the lack of mutual interference in the alignment of multiple connections $V_j$, no iterative alignment steps between multiple connections $V_j$ are necessary.

In addition, it is advantageous that the system according to the invention can be provided at low cost, as fewer alignment devices are required, since only one alignment device is required for each connection $V_j$.

A further advantage of the method and network according to the invention is the direct connection of the source to each receiver via a quantum channel. This increases the number of physical connections, i.e. the quantum channels only via the relation i(i−1)/2. In contrast, a network with a direct connection between the individual receivers would require a large number of additional quantum channels.

The method and system for quantum key generation comprise at least four receivers, preferably i receivers E, with the number i equal to a natural number equal to or greater than 4 and with the numbering p equal to a natural number.

Two receivers Ep of an entangled photon pair form a connection $V_j$ with the numbering j equal to a natural number. A total of s connections $V_j$ are possible between all receivers, with $$s \geq \frac{i(i-1)}{2}.$$

In each time span $t_k$ r connections $V_j$ are aligned, with the number r equal to a natural number greater than 2 and less than s.

The method and system for quantum key generation use several time spans $t_k$, preferably q time spans $t_k$ with the number q equal to a natural number equal to or greater than 2 and with the numbering k equal to a natural number. This means that quantum key generation is performed between all receivers within the several, preferably the q time spans $t_k$. Performing quantum key generation with the q time spans $t_k$ can also be described as a complete rotation.

The method according to the invention and the system according to the invention result in an improved time efficiency factor for the generation of quantum keys with $$\frac{s}{q} > 1.$$

The temporal efficiency factor describes the increase in the generation rate for a method and a system in which a quantum key is always only generated between two receivers. A comparison with a method and a system in which all connections are aligned simultaneously differs greatly in the respective quality of the alignment between all connections.

It is essential that only the connections $V_j$ in which the alignment has taken place are used for quantum key generation in a certain time span $t_k$.

By at least four receivers, preferably between i receivers ED with i equal to a natural number equal to or greater than 4 and with p equal to a natural number, it is to be understood here that the quantum key generation is performed between four receivers, or five receivers, or six receivers, or seven receivers or multiple receivers.

Quantum key generation between all receivers means that each of these two or more receivers, which are connected to the source via a splitter and/or a switch via a common quantum channel, can generate quantum keys with all other receivers, but not with the one or more receivers which also receive photons via the splitter and/or switch. The essential point here is that these two or more receivers, which are connected to the source via a splitter and/or a switch via a common quantum channel, cannot generate a quantum key among themselves.

Advantageously, this results in a simpler and more cost-effective network, as only a single quantum channel is required for connecting these two or more receivers to the source. A splitter can, for example, be designed as a beam splitter which splits the photons randomly to one of its output channels. A switch can, for example, be designed as a movable mirror or a pluggable connection, whereby the photons are directed to one of the output channels depending on the position of the mirror or the plugged connection. The splitters and/or switches can represent or form an access node, or service node, or a relay node, or a user node. Such a design enables a more cost-effective connection of multiple receivers to each other. For example, several user nodes and their associated access nodes can form a QKD access network (QAN) that is suitable for covering metropolitan areas. And multiple relay nodes can form a QKD backbone network (QBN) to connect multiple QANs for wide-area coverage.

Quantum key generation between all of the at least four receivers means in particular that, for example, in the case of four receivers with the first receiver $E_1$ and the second receiver $E_2$ behind a switch and the third receiver $E_3$ and the fourth receiver $E_4$ behind a switch, a quantum key is generated in each case between the first receiver $E_1$ and the third receiver $E_3$, and the first receiver $E_1$ and the fourth receiver $E_4$, and the second receiver $E_2$ and the third receiver $E_3$, and the second receiver $E_2$ and the fourth receiver $E_4$.

Further, quantum key generation between all of the at least four receivers means, in particular, that a quantum key is generated between these at least four receivers as described above. There may be other receivers in the system connected to the source that do not generate a quantum key at the time of quantum key generation between the four receivers in the time spans, but are also participating receivers in a subsequent quantum key generation.

The generation of several entangled photon pairs in the source and in step i) means that several entangled photon pairs can be generated simultaneously and/or successively in the source. Simultaneously means that several entangled photon pairs are generated at the same or approximately the same time, wherein the wavelengths of these entangled photon pairs differ from each other. Successively means that several entangled photon pairs can be generated in succession, wherein these photon pairs can have the same wavelength or different wavelengths. The entangled photon pairs with the same wavelength generated in succession increase the length of the quantum key between two specific receivers. Entangled photon pairs with different wavelengths enable quantum key generation between several different receivers of the multiple connections $V_j$. This applies in the same way to steps ii), iii) and iv), wherein in step ii) several signal photons and idler photons from different entangled photon pairs are simultaneously and/or successively distributed to the quantum channels and transmitted into them, and in step iii) the photons are detected simultaneously at several receivers or successively at one or more receivers, and in step iv) several quantum keys are generated simultaneously and/or successively between several receivers.

By method for quantum key generation with entangled photon pairs is meant that steps i), ii) and iii) are carried out successively for one entangled photon pair each, but steps i), ii) and iii) can also be carried out simultaneously for several photon pairs with different wavelengths.

Alignment of the entanglement property means that the reference system of the entanglement property, which is used for measuring a photon pair in the detection module in the detection in step iii), is matched at the two corresponding receivers before and/or during step ii). For example, in the case of photon pairs that are entangled in polarization, the polarization is matched in the respective detection modules with a transmission via the corresponding connection $V_j$ as a reference system, wherein a possible polarization rotation, for example due to the transmission of the photons in fibers or arrangement of the elements of the system, can be compensated by so-called polarization controllers. For example, at a first receiver, a laser beam with a defined polarization in a base, for example horizontally polarized, is transmitted to a second receiver and the polarization of the laser beam in this base is measured at the second receiver. The quantum channel in the first base can be adjusted, for example, by minimizing the laser beam at the second receiver during a measurement in the vertical polarization. This minimization is carried out in a further step for a second base which is orthogonal to the first base, for example for the +/−45° horizontally polarized laser beam. If the photon pairs are entangled in time, a phase alignment is carried out in the respective interferometers of the receivers. Furthermore, it is essential that in the method according to the invention and the system according to the invention, only connections $V_j$ are aligned in each individual time span $t_k$ for which independent alignment is possible, i.e. which do not interfere with or influence each other. As a result, the alignment can be carried out much more precisely and quickly, which leads to a higher generation rate of the quantum key. Only between two or more connections $V_j$ means that at least two connections $V_j$ and at most all other possible connections $V_j$ are aligned in a time span, which can be aligned independently of each other.

Alignment of the connection $V_j$ independently of each other in a time span $t_k$ means that the adjustment of the reference system of the receivers and the connections $V_j$ does not interfere or influence each other in this time span $t_k$. This can significantly improve the quality of the transmission and detection of the photons, which leads to a higher generation rate of the quantum key. For example, with four receivers, the connection $V_1$ between the first receiver $E_1$ and the second receiver $E_2$ can be aligned independently of the connection $V_2$ between the third receiver $E_3$ and the fourth receiver $E_4$. As a further example, with four receivers, the connection $V_1$ between the first receiver $E_1$ and the second receiver $E_2$ can be aligned independently of the connection $V_2$ between the first receiver $E_1$ and the third receiver $E_3$, if the alignment of the connection $V_1$ takes place at the second receiver $E_2$ and the alignment of the connection $V_2$ takes place at the third receiver $E_3$, whereas an alignment of the connection $V_1$ at the second receiver $E_2$ and the alignment of the connection $V_2$ at the first receiver $E_1$ would interfere with the alignment of the connection $V_1$ or would not be possible due to a splitter or switch.

Replacing at least one connection $V_j$ with another connection $V_{j+x}$, with x as an integer number, means that only one connection $V_j$ of the preceding time span $t_k$ is exchanged and replaced by a connection $V_{j+x}$, in which quantum key generation was not yet possible, or that two connections $V_j$, $V_{j+1}$ of the preceding time span $t_k$ are exchanged and replaced by two connections $V_{j+x1}$, $V_{j+x2}$ in which quantum key generation was not yet possible, and so on for three, four and more connections, or that all connections of the preceding time span $t_k$ are exchanged and replaced by the corresponding number of connections in which quantum key generation was not yet possible.

A connection $V_j$ in which quantum key generation was not yet possible means that steps i) to iii) have not yet been run through for this connection $V_j$, while this connection $V_j$ was aligned independently before and/or during step ii). This means that, for the purposes of the method and system mentioned herein, quantum key generation between two receivers is only described as possible if the corresponding connection $V_j$ was and/or is aligned before and/or during the transmission of the photons in step ii). If there is no alignment, photons can be measured, but no common key can be generated due to the different reference systems of the receivers.

To perform quantum key generation between all receivers by the multiple time spans $t_k$ means that after the multiple time spans $t_k$ for all possible connections between all receivers the steps i), ii), iii) and iv) have been run through and that for all connections $V_j$ before and/or during step ii) in at least one time span $t_k$ an alignment has taken place.

It may be provided that the multiple time spans are repeated several times, preferably repeated several times in succession, preferably repeated a second time, or a third time, or a fourth time or more. This means that a complete rotation is repeated one after the other. This allows quantum keys to be generated between all receivers over a longer period of time.

It may be provided that the time spans $t_k$ are performed sequentially for quantum key generation. This means that the time spans $t_k$ are formed in direct succession for quantum key generation. In direct succession means that no other connections are provided in between. In direct succession also means that no connections $V_j$ are provided between the time spans $t_k$ in a time window, for example to carry out maintenance work. This results in a simple generation of quantum keys between all receivers.

It may be provided that the time spans $t_k$ are not performed sequentially for quantum key generation. This means that the time spans $t_k$ are not formed in direct succession for quantum key generation. Other connections can therefore be provided between two time spans $t_k$. Other connections can be one or more connections $V_j$ from one of the multiple time spans $t_k$, or multiple connections that cannot be aligned independently of each other. A non-sequential implementation has the advantage that certain connections $V_j$ can be provided several times, for example if there is an increased demand for quantum keys between two specific receivers. Connections $V_j$ that can be aligned independently benefit from the higher quality and generation rate. Thus, in a non-sequential implementation, after one of the multiple time spans $t_k$, one of the time spans $t_k$ can be repeated or a new time span can be inserted in which connections $V_j$ are provided, which can be aligned independently of each other. If necessary, connections between two time spans that cannot be aligned independently of each other can also be provided, resulting in an increased adjustment requirement or a poorer generation rate in these connections.

It may be provided that in step i) the entangled photon pairs are generated by a non-linear process, preferably by parametric fluorescence (down-conversion), or spontaneous parametric fluorescence (spontaneous parametric down-conversion), or four-wave mixing. It may be provided that the source comprises one or more non-linear crystals which are designed to generate entangled photon pairs by a non-linear process, preferably by parametric fluorescence (down-conversion), or spontaneous parametric fluorescence (spontaneous parametric down-conversion), or four-wave mixing. These non-linear processes can be used to generate entangled photon pairs in different wavelength ranges in a simple manner.

It may be provided that the entangled photon pairs are entangled in time, and/or polarization, and/or orbital angular momentum, and/or spin angular momentum. The advantage of using photon pairs entangled in time is robust entanglement. The advantage of using photon pairs entangled in polarization is the simple generation and alignment, as well as a possible automation of the alignment. The advantage of using photon pairs entangled in orbital angular momentum and/or spin angular momentum is the possible high dimensions of the photon pairs.

It may be provided that a polarization rotation in the connection $V_j$ is compensated for the alignment of photon pairs that are entangled in the polarization. It may be provided that the alignment device for photon pairs entangled in the polarization comprises one or more wavelength plates, and/or fiber squeezers, and/or polarization controllers, and/or liquid crystals. The multiple components can also be combined with each other, allowing for even more precise adjustment. The advantage of this type of design is the easily controllable alignment, which can also be automated, and the low-cost components.

It may be provided that a time span in the connection $V_j$ is compensated for the alignment of photon pairs that are entangled in time. It may be provided that the alignment device for photon pairs entangled in time has one or more optical delay means. The advantage of this type of design lies in the very precise and simple control of the alignment.

It may be provided that a change in angular momentum in the connection $V_j$ is compensated for the alignment of photon pairs entangled in orbital angular momentum and/or spin angular momentum. It may be provided that the alignment device for photon pairs entangled in the orbital angular momentum and/or in the spin angular momentum has one or more wavelength plates and/or spatial light modulator (SLM). The advantage of this type of design is the easily controllable alignment, which can also be automated.

It may be provided that each receiver or each quantum channel of a receiver has an alignment device. Advantageously, the method and the system according to the invention do not require all alignment devices for aligning all possible connections $V_j$ and thus provide a fail-safe system in which the alignment in a failed alignment device can be replaced by an alignment device that is not yet in use. It is essential that for the method according to the invention and the system according to the invention for aligning all connections $V_j$ only $i-1$ alignment devices are necessary, in the case of a method and a system with i receivers. It is possible that the system only has $i-1$ alignment devices. This makes it possible to provide a cost-effective system.

It may be provided that the alignment per connection $V_j$ before and/or during step ii) is performed by only one alignment device, arranged at one of the two receivers or in one of the two quantum channels. Advantageously, it follows from the arrangement of the source, the receivers and the quantum channels that in such an embodiment, the alignment of the entire connection $V_j$ can be performed by a single alignment device, which is arranged somewhere between the two receivers. This simplifies the alignment process. An alignment device that is located directly at the respective receiver is particularly protected against external interference, i.e. attempted manipulation and interference, as no additional communication between the receiver and the alignment device via public channels is required for adjustment.

It may be provided that the alignment is carried out, monitored and/or controlled before and/or in step ii) by a control device which is connected to all alignment devices. It may be provided that the control device is arranged at one of the receivers. It may be provided that the control device is designed as a computer or integrated circuit (IC), preferably as an FPGA element (Field Programmable Gate Array). It may be provided that the computer or integrated circuit (IC), preferably as a field programmable gate array (FPGA) element, comprises a storage medium comprising instructions which, when executed by the computer or integrated circuit (IC), preferably as a field programmable gate array (FPGA) element, cause it to perform the alignment before and/or during step ii). The advantage of such a design is that the process can be automated.

It may be provided that in step i) entangled photon pairs with wavelengths are generated which are randomly distributed over a broad spectrum or entangled photon pairs with specific wavelengths are generated in a targeted manner. It may be provided that in step i) entangled photon pairs are generated in each time span $t_k$ for all possible connections $V_j$, or that in step i) entangled photon pairs are generated in each time span $t_k$ only for the connections $V_j$ also aligned therein. The advantage of generating photons in a broad spectrum is the cost-effective provision of entangled photon pairs for a large number of receivers. The advantage of generating photons with specific wavelengths is that photons can be generated specifically for each connection $V_j$ in the corresponding time span $t_k$ for these connections $V_j$, which can increase the generation rate for quantum key generation.

It may be provided that the photons generated in step i) are generated in a signal wavelength range and idler wavelength range spectrally different from each other. By spectrally different from each other, it is meant here that the wavelength of the signal photon and the idler photon of the pairs differ, and that the wavelengths of the pairs differ from each other. This results in the advantage of simpler and lower-loss splitting of the photons in step ii).

It may be provided that the photon pairs generated in step i) are spectrally separated from each other for each connection $V_j$. Here, spectrally separated entangled photon pairs means that the signal and idler photons of a photon pair have different wavelengths, i.e. $\lambda_{sx} \neq \lambda_{ix}$ applies. This is also referred to as a non-degenerated photon pair. In addition, for the several spectrally separated entangled photon pairs, the wavelengths of the signal photons of the photon pairs differ spectrally from each other, i.e. $\lambda_{sx} \neq \lambda_{s(x+1)}$ applies. This also applies accordingly to the idler photons, i.e. the wavelengths of the idler photons also differ spectrally from each other, i.e. $\lambda_{ix} \neq \lambda_{i(x+1)}$ applies. It is essential here that several of the spectrally separated photon pairs can be generated in succession in order to produce a longer quantum key.

It may be provided that the frequency multiplexer is designed to perform the splitting of the signal photons and the idler photons in step ii).

Preferably, distributing the signal and idler photons to the quantum channels in step ii) and by the frequency multiplexer based on their wavelength means that the source generates signal and idler photons with different wavelengths and the photons are transmitted, preferably in a spatial mode, to the frequency multiplexer.

The frequency multiplexer distributes the signal and idler photons to the various quantum channels according to their wavelength.

It may be provided that one or more or all quantum channels are designed as fiber optic channels and/or have fiber optic lines. In this context, fiber optic lines mean that not the entire transmission takes place via a fiber optic cable, but that free-running lines are also possible over partial areas. The advantage of such a design is the cost-effective and simple structure of the network.

It may be provided that the detection in step iii) is carried out by a detection module for each receiver. It may be provided that each detection module has one or more detectors and a measuring module. The measuring module and the detectors can be used to determine the entanglement property of the photons for quantum key generation and the time of detection of the photon.

It may be provided that the at least one detector or the multiple detectors are designed as single photon detectors, preferably as germanium or silicon detectors, or single photon avalanche diodes or indium-gallium-arsenite detectors, or superconducting nanowire single photon detectors, or silicon avalanche photodiodes.

It may be provided that the measuring module has a polarizer, and/or an asymmetrical interferometer, and/or a spatial light modulator (SLM).

It may be provided that the receiver has multiple detection modules. It may be provided that the multiple detection modules of a receiver detect photons in different wavelength ranges. It may be provided that in step iii) one or more receivers simultaneously detect multiple signal photons and/or idler photons with different wavelengths. This allows the receiver to generate quantum keys simultaneously with several other receivers, as photons with different wavelengths can be detected at the same time. It may be provided that frequency filters are arranged in front of the multiple detection modules in order to enable quantum key generation with several receivers simultaneously by assigning the photons among the detection modules on the basis of their wavelength. This means that a partner receiver can be assigned to each detection module of a receiver. It may be provided that the frequency filter is designed as a dichroic mirror, or as a grating, or as a filter.

It may be provided that in step iv) for quantum key generation, a raw key is generated at both receivers from the detected photons in step iii). It is also possible that a sifting of the raw key is carried out after the raw key has been generated. For sifting purposes, information is exchanged between the two receivers after the photons have been measured. This information includes, for example, the time stamps of the measured photons. Each receiver then carries out the sifting process on their own raw key. It is possible that additional steps, such as error detection and/or error correction and/or privacy amplification, are carried out after the sifting. A common key can be generated for both receivers by quantum key generation through the sifting and any further steps.

It may be provided that a transmission rate of entangled photons between two or more receivers of at least 1 kHz, preferably at least 100 kHz, most preferably at least 10 MHz takes place.

It may be provided that the quantum key generation in step iv) for the connections of a time span $t_k$ takes place during and/or after the corresponding time span $t_k$. During means that steps i) to iv) are carried out in each time span. After means that steps i) to iii) are carried out in each time span and step iv) is carried out after the respective time span. The generation of the quantum key from the raw key can also start during the respective time span and only be completed in the next time span. It is essential that, by the detection of the photons in step iii), a raw key for quantum key generation can already be generated, which is used to generate the common key. The implementation of step iv) enables a complete quantum key generation in the respective time span, wherein, during the generation of further photons, a quantum key can already be generated from the photons already detected.

It may be provided that in each time span $t_k$ for at least two connections $V_j$ steps i) to iii) are carried out with the alignment, preferably steps i) to iv). This means that in each time span $t_k$ for two connections $V_j$ steps i) to iii), preferably steps i) to iv), are carried out with the alignment, or for three connections $V_j$ steps i) to iii), preferably steps i) to iv), are carried out with the alignment, or for four connections $V_j$ steps i) to iii), preferably steps i) to iv), are carried out with the alignment, and so on. The more connections $V_j$ are aligned in each time span $t_k$, the greater the generation rate of the quantum keys for all receivers.

It may be provided that in each time span $t_k$ a receiver is included at most once in the connections $V_j$ of the respective time span $t_k$. This makes it easy to ensure that the connections $V_j$ of this time span $t_k$ are aligned independently of each other.

It may be provided that in each time span $t_k$ a receiver is included in several of the connections $V_j$ of the respective time span $t_k$. It is essential here that the alignment of all connections $V_j$ in this time span $t_k$ continues to take place independently of each other. However, this means that a receiver with a high communication requirement can be provided several times with a higher rate of quantum key generation.

It may be provided that each time span t is at least 1 s, preferably at least 1 min, preferably at least 5 min or more. It may be provided that the length of the time spans $t_k$ differ from one another. The advantage of this is that for connections $V_j$ which have a higher or lower key requirement, the time spans $t_k$ can be adapted to the respective requirement.

In the following examples, the receivers $E_1$, $E_2$ etc. are referred to as receiver A, B etc. for better understanding.

As a non-exclusive first example, a method and a system for quantum key generation with four receivers ($A_1$, $A_2$, $B_1$, $B_2$) is given here. In this method and system, all $A_i$ receivers can perform quantum key generation with all $B_i$ receivers. However, it is not possible to generate a quantum key between the two receivers $A_1$ and $A_2$ or between the two receivers $B_1$ and $B_2$. Due to the four receivers ($A_1$, $A_2$, $B_1$, $B_2$) and the communication option this results in s=4 connections by the number of receivers $A_i$ multiplied by the number of receivers $B_i$ with $A_1B_1$, $A_1B_2$, $A_2B_1$ and $A_2B_2$.

In this non-exclusive first example, steps i) to iii), preferably steps i) to iv), of these connections are allocated to q=2 time spans, each time span $t_k$ comprising r=2 connections $V_j$ with, for example, the following allocation:

$$t_1 = [A_1B_1, A_2B_1]$$

$$t_2 = [A_1B_2, A_2B_2]$$

Two further allocations are given here as examples:

$$t_1 = [A_1B_1, A_1B_2]$$

$$t_2 = [A_2B_1, A_2B_2]$$

$$t_1 = [A_1B_1, A_2B_2]$$

$$t_2 = [A_1B_2, A_2B_1]$$

In all cases, the time efficiency factor is $$\frac{s}{q} = 2.$$

As a non-exclusive second example, a method and a system for quantum key generation with five receivers ($A_1$, $A_2$, As, $B_1$, $B_2$) is given here. In this method and system, all $A_i$ receivers can perform quantum key generation with all $B_i$ receivers. However, it is not possible to generate a quantum key between the receivers $A_1$, $A_2$ and $A_3$ or between the two receivers $B_1$ and $B_2$.

Due to the five receivers ($A_1$, $A_2$, As, $B_1$, $B_2$) and the communication option, s=6 connections are created by the number of receivers $A_i$ multiplied with the number of receivers $B_i$ with $A_1B_1$, $A_1B_2$, $A_2B_1$, $A_2B_2$, $A_3B_1$ and $A_3B_2$.

In this non-exclusive second example, steps i) to iii), preferably steps i) to iv), of these connections are allocated to q=2 time spans, each time span $t_k$ comprising r=3 connections $V_j$ with, for example, the following allocation:

$$G_1 = [A_1B_1, A_2B_1, A_3B_1]$$

$$G_2 = [A_1B_2, A_2B_2, A_3B_2]$$

The time efficiency factor is $$\frac{s}{q} = 3.$$

It should be noted here that in this case the alignment of the entanglement property can only be carried out by the receivers with the larger number, i.e. in this case by the $A_i$ receivers. This means that the $B_i$ receivers do not necessarily have to be equipped with a device for aligning the entanglement property.

BRIEF DESCRIPTION OF THE DRAWINGS

Further embodiments of the invention are shown in the figures and described below. The figures show an example of a possible embodiment of the invention. This embodiment serves to explain a possible implementation of the invention and should not be understood as limiting. They show.

DETAILED DESCRIPTION

Figure 1:
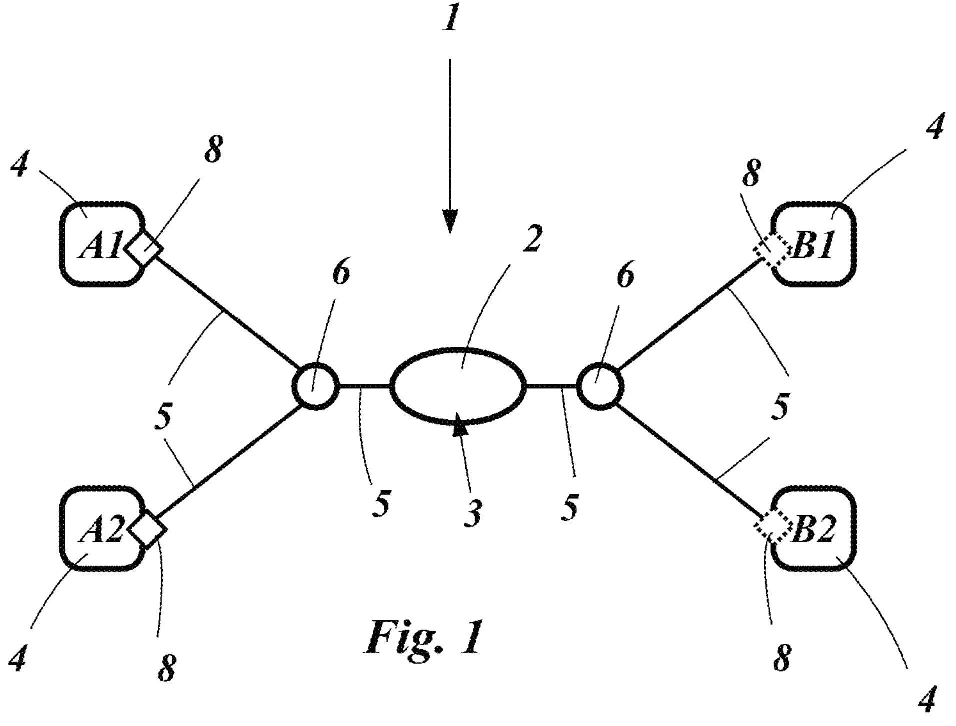
FIG. 1: a schematic view of a system according to the invention with four receivers and two splitters in the quantum channels.

FIG. 1 shows a schematic view of an embodiment of a system 1 according to the invention for quantum key generation with entangled photon pairs between four receivers $A_1$, $A_2$, $B_1$ and $B_2$. The receivers $A_1$ and $A_2$ (or $B_1$ and $B_2$) are each connected to a splitter 6 via a separate quantum channel 5 and to the source 2 via a common quantum channel 5. In this embodiment, it is essential that the two receivers 4 $A_1$ und $A_2$ (or $B_1$ and $B_2$), which are connected to the source 2 via a common quantum channel 5 using a splitter 6, cannot generate a quantum key between each other. Quantum key generation between all receivers 4 means that each of these two receivers $A_1$ and $A_2$ (or $B_1$ and $B_2$), which are connected to the source 2 via a common quantum channel 5 using a splitter 6, can generate quantum keys with all other receivers 4 $B_1$ and $B_2$ (or $A_1$ and $A_2$), but not with each other. In this embodiment, a frequency multiplexer 3 is arranged in the source 2, which is designed to assign the signal photons and idler photons of the entangled photon pairs to the quantum channels 5 of the multiple receivers 4 on the basis of their wavelength.

In the embodiment of FIG. 1, the receivers 4 $A_1$ and $A_2$ each have an alignment device 8. Optionally, only or also the receivers 4 $B_1$ and $B_2$ have an alignment device 8, as shown in dashed lines. The alignment devices 8 adjust the reference systems with regard to the entanglement properties of the different receivers 4.

Figure 2:
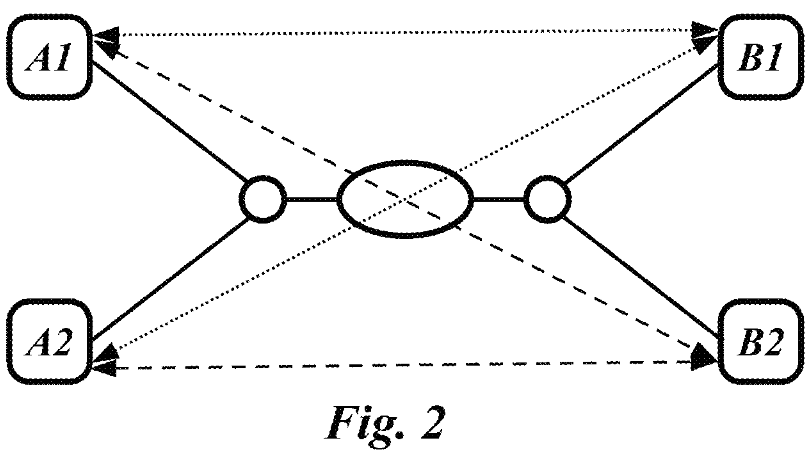
FIGS. 2-4: a schematic view of the system from FIG. 1 with the possible connections $V_j$.
Figure 3:
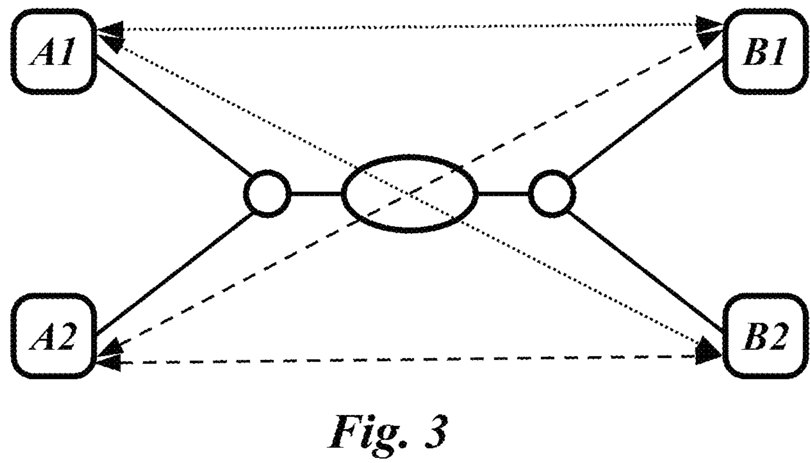
Figure 4:
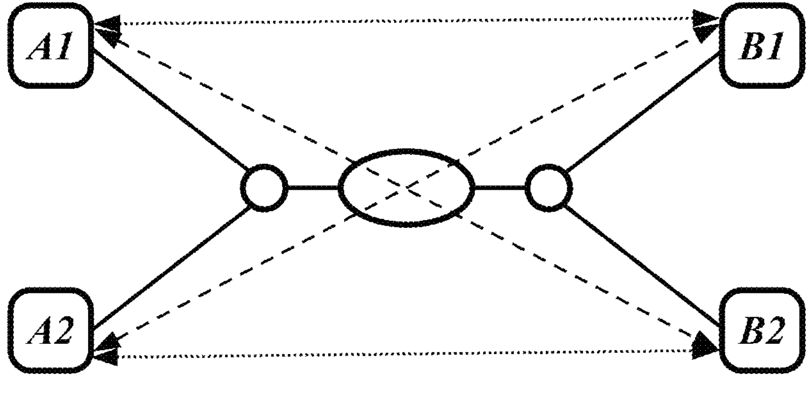

FIGS. 2, 3 and 4 show the system 1 for quantum key generation according to the invention from FIG. 1, wherein the alignment devices 8 are not shown in FIGS. 2, 3 and 4 for a better overview. FIGS. 2, 3 and 4 show the possible connections between the receivers 4 for quantum key generation and their division into the several time spans $t_k$.

FIG. 2 shows a first possible allocation of the connections, wherein a quantum key is generated between the receivers $A_1$ and $B_2$ and the receivers $A_2$ and $B_2$ (dashed arrows) in a first time span $t_1$ with alignment of the connection. In a second time span $t_2$ a quantum key generation takes place between the receivers $A_1$ and $B_1$ and the receivers $A_2$ and $B_1$ (dotted arrows) with alignment of the connection.

FIG. 3 shows a second possible allocation of the connections, wherein a quantum key is generated between the receivers $A_2$ and $B_1$ and the receivers $A_2$ and $B_2$ (dashed arrows) in a first time span $t_1$ with alignment of the connection. In a second time span $t_2$, a quantum key is generated between the receivers $A_1$ and $B_1$ and the receivers $A_1$ und $B_2$ (dotted arrows) with alignment of the connection. The difference to the connections of FIG. 2 is that for FIG. 2 the alignment devices 8 are sufficient at the receivers $A_1$ and $A_2$, and for FIG. 3 the alignment devices 8 can be arranged at the receivers $B_1$ and $B_2$.

FIG. 4 shows a third possible allocation of the connections, wherein a quantum key is generated between the receivers $A_1$ and $B_2$ and the receivers $A_2$ and $B_1$ (dashed arrows) in a first time span $t_1$ with alignment of the connection. In a second time span $t_2$ a quantum key is generated between the receivers $A_1$ und $B_1$ and the receivers $A_2$ and $B_2$ (dotted arrows) with alignment of the connection.

Figure 5:
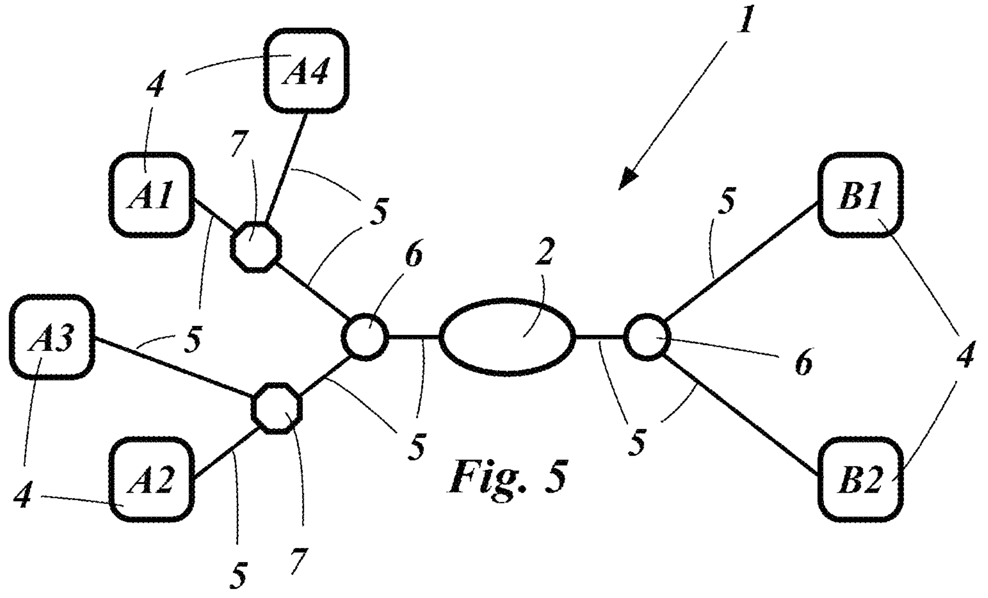
FIG. 5: a schematic view of a system according to the invention with six receivers, two splitters and two switches in the quantum channels.
Figure 6:
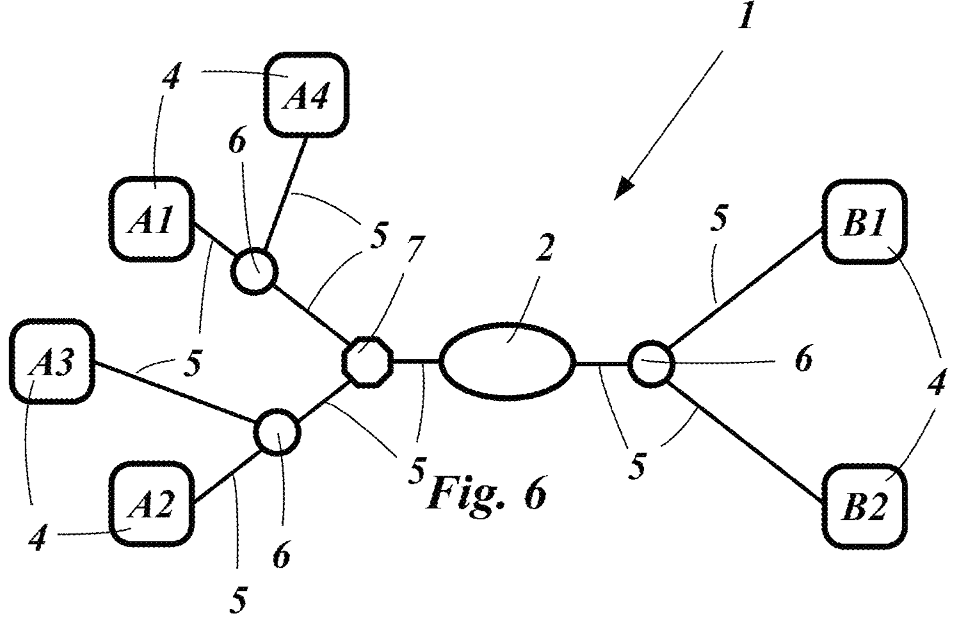
FIG. 6: a schematic view of a system according to the invention with six receivers, three splitters and one switch in the quantum channels.

FIGS. 5 and 6 show two further embodiments of the system 1 according to the invention for quantum key generation with six receivers 4.

In these embodiments, the source 2 is connected to the six receivers 4 via several quantum channels 5, splitters 6 and switches 7. The only difference between FIGS. 5 and 6 is that in FIG. 5 the receivers $A_1$, $A_2$, $A_3$ and $A_4$ are first connected to the source 2 via a splitter 6 and then further division takes place using two switches 7, while in FIG. 6 the receivers $A_1$, $A_2$, $A_3$ and $A_4$ are first connected to the source 2 via a switch 7 and then further division takes place using two splitters 6. In both embodiments, the quantum key is generated in the same way as in the embodiments shown in FIGS. 1 to 4.

Figure 7:
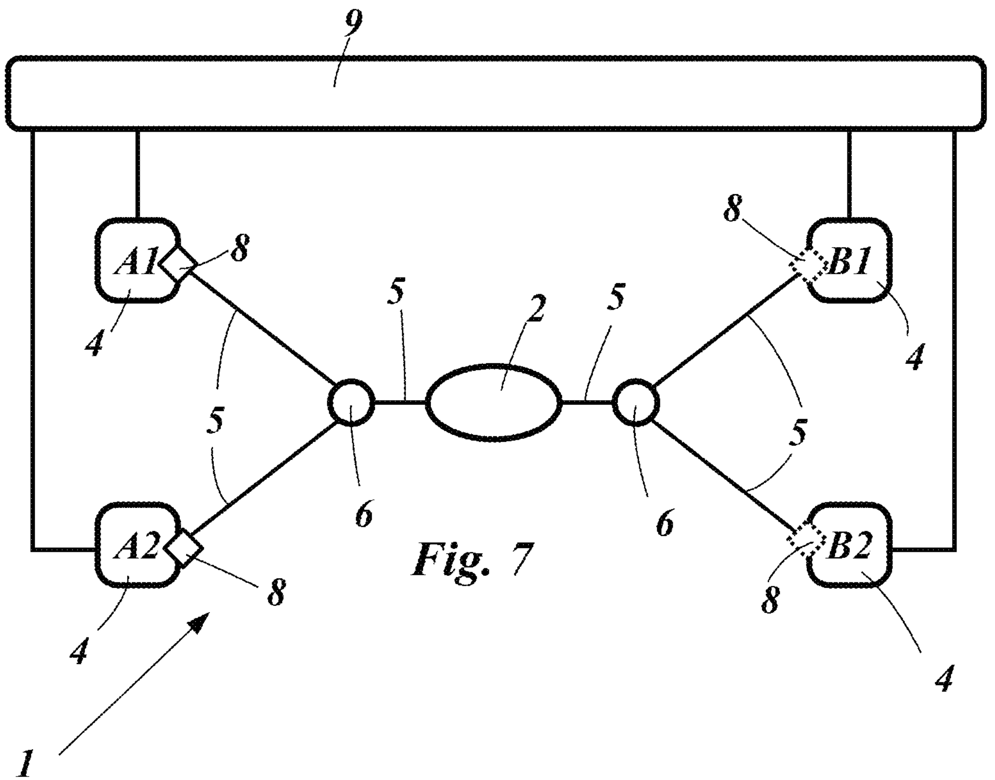
FIG. 7: a schematic view of the system of FIG. 1 with a control device.

FIG. 7 shows the system 1 for quantum key generation from the embodiment of FIG. 1, whereby the control device 9 is also shown in FIG. 7. In this embodiment, the control device 9 (key management system) is connected to the alignment devices 8 via lines and the respective receiver 4.

LIST OF REFERENCE SIGNS

1 System for quantum key generation
2 Source
3 Frequency multiplexer
4 Receiver
5 Quantum channel
6 Splitter
7 Switch
8 Alignment device
9 Control device

The invention claimed is:

1. A method for quantum key generation with entangled photon pairs between at least four receivers, wherein in each case two receivers of an entangled photon pair form a connection $V_j$ for quantum key generation, with the following steps:

i) generating entangled photon pairs in a source, each photon pair comprising a signal photon and an idler photon which are entangled with each other in an entanglement property;

ii) splitting the signal photons and the idler photons on the basis of their wavelength to quantum channels of the multiple receivers and transmitting the signal photons and the idler photons from the source to the receivers via the quantum channels forming connections $V_j$;

iii) detection of the signal photons and idler photons at the respective receivers;

iv) quantum key generation between the receivers of the entangled photon pairs;

wherein several time spans are formed for quantum key generation between all receivers, with steps i) to iii) being carried out in each time span, and in each time span before and/or during step ii), an entanglement property alignment is performed only between two or more connections $V_j$ which can be aligned independently of one another in order to enable quantum key generation in these two or more connections $V_j$, and the time spans differ in such a way that in each case at least one connection $V_j$ is replaced by another connection $V_j$ in which quantum key generation was not yet possible in order to carry out quantum key generation between all receivers by means of the multiple time spans, and the transmission in step ii) takes place via a splitter and/or switch in the quantum channel, and wherein in step i) entangled photon pairs are generated with wavelengths which are randomly distributed over a broad spectrum or entangled photon pairs are generated with specific wavelengths in a targeted manner.

2. The method according to claim 1, wherein the alignment per connection $V_j$ before and/or during step ii) is performed by only one alignment device arranged at one of the two receivers or in one of the two quantum channels.

3. The method according to claim 2, wherein the alignment is carried out, monitored and/or controlled before and/or in step ii) by a control device which is connected to all alignment devices.

4. The method according to claim 1, wherein in step iii) one or more receivers simultaneously detect multiple signal photons and/or idler photons with different wavelengths.

5. The method according to claim 1, wherein the quantum key generation in step iv) for the connections of a time span $t_k$ takes place during and/or after the corresponding time span $t_k$.

6. The method according to claim 1, wherein the multiple time spans are repeated several times.

7. The method according to claim 1, wherein in each time span $t_k$, a receiver is included at most once in the connections $V_j$ of the respective time span $t_k$, or wherein, in each time span $t_k$, a receiver is included in several of the connections $V_j$ of the respective time span $t_k$.

8. The method according to claim 1, wherein in step i), entangled photon pairs are generated in each time span $t_k$ for all possible connections $V_j$, or wherein, in step i), entangled photon pairs are generated in each time span $t_k$ only for the connections $V_j$ also aligned therein.

9. The method according to claim 1, wherein the entangled photon pairs are entangled in time, and/or polarization, and/or orbital angular momentum, and/or spin angular momentum.

10. The method according to claim 9, wherein in the connection $V_j$, a polarization rotation is compensated for the alignment of photon pairs that are entangled in the polarization, and/or in the connection $V_j$, a time span is compensated for the alignment of photon pairs that are entangled in time, and/or in the connection $V_j$, a change in angular momentum is compensated for the alignment of photon pairs entangled in orbital angular momentum and/or spin angular momentum.

11. The method according to claim 1, wherein in step i), the entangled photon pairs are generated by a non-linear process.

12. A system for quantum key generation with entangled photon pairs between at least four receivers, wherein the system comprises a source, a frequency multiplexer, several quantum channels and the multiple receivers, each of the multiple receivers being connected to the source via a quantum channel, wherein the source is designed to generate entangled photon pairs each comprising a signal photon and an idler photon which are entangled with each other in an entanglement property, wherein entangled photon pairs are generated with wavelengths which are randomly distributed over a broad spectrum or entangled photon pairs are generated with specific wavelengths in a targeted manner, wherein the quantum channels of two receivers of an entangled photon pair form a connection $V_j$ for quantum key generation, wherein the frequency multiplexer is arranged in or after the source, wherein the frequency multiplexer is designed to distribute the signal photons and idler photons to the quantum channels of the multiple receivers on the basis of their wavelength, wherein each receiver has a detection module which has a measuring module and at least one detector which are designed to detect the entanglement property of the photons for quantum key generation, wherein the system has alignment devices which are arranged in the receivers or in the quantum channels to the receivers and are designed to perform an alignment of the entanglement property of the entangled photon pairs with respect to two receivers, wherein the system additionally has a control device and the control device is connected to each alignment device, and wherein the control device is designed to control the alignment devices in several time spans for quantum key generation between all receivers, wherein the control device is designed to control in each time span only the alignment devices between two or more connections $V_j$ which can be aligned independently of each other in order to enable quantum key generation in these two or more connections $V_j$, wherein the control device is designed to replace, in each time span, the control of the alignment device of at least one connection $V_j$ by the control of the alignment device of another connection $V_j$ in which quantum key generation was not yet possible in order to perform quantum key generation between all receivers by means of the multiple time spans, and wherein two or more receivers are connected to the source via a splitter and/or a switch via a common quantum channel.

13. The system according to claim 12, wherein each receiver or each quantum channel of a receiver has an alignment device, or the system only has i-1 alignment devices, wherein i is the number of receivers.

* * * * *